(12) United States Patent
Flöh et al.

(10) Patent No.: US 7,554,532 B2
(45) Date of Patent: Jun. 30, 2009

(54) ACTIVE SURFACE

(75) Inventors: Georg Flöh, Landsberg (DE); Stefan Worlitzer, Landsberg (DE)

(73) Assignee: Data Modul AG, Munich (DE)

( * ) Notice: Subject to any disclaimer, the term of this patent is extended or adjusted under 35 U.S.C. 154(b) by 1051 days.

(21) Appl. No.: 10/468,512

(22) PCT Filed: Feb. 19, 2002

(86) PCT No.: PCT/DE02/00618

§ 371 (c)(1),
(2), (4) Date: Aug. 20, 2003

(87) PCT Pub. No.: WO02/067645

PCT Pub. Date: Aug. 29, 2002

(65) Prior Publication Data

US 2006/0071909 A1    Apr. 6, 2006

(30) Foreign Application Priority Data

Feb. 20, 2001   (DE)   ................... 101 08 011

(51) Int. Cl.
*G06F 3/38*   (2006.01)
*G09G 5/00*   (2006.01)
(52) U.S. Cl. ....................... 345/204; 345/156
(58) Field of Classification Search ........ 345/156, 345/204, 87; 361/681; 455/566
See application file for complete search history.

(56) References Cited

U.S. PATENT DOCUMENTS 6,035,180 A    3/2000   Kubes et al. ............... 455/90

FOREIGN PATENT DOCUMENTS

| DE | 19744382 A1 | 4/1998 |
| DE | 19714301 A1 | 6/1999 |
| DE | 19835433 A1 | 2/2000 |
| EP | 0651544 A2 | 10/1994 |
| EP | 0859498 A2 | 8/1998 |

*Primary Examiner*—Ricardo L Osorio
(74) *Attorney, Agent, or Firm*—Davis & Bujold, P.L.L.C.

(57) ABSTRACT

A housing for electronic and electrical units comprising a display device or an operator interface, whereby the display device and/or the user interface extend(s) over the entire surface of the housing or casing.

4 Claims, 2 Drawing Sheets

ACTIVE SURFACE

FIELD OF THE INVENTION

The present invention concerns a housing for electronic and electrical devices, as well as casings for electronic and electrical devices with display installations.

BACKGROUND OF THE INVENTION

A plurality of housings of electronic and electrical devices are known from prior art, whereby the housings exhibit different shapes and surface compositions and are made from different materials. Similarly, a number of shapes and compositions for casings—for example, for dashboards in automobiles—are known from prior art.

Display installations (displays) and/or control surfaces (keys, buttons) are customarily integrated into such a housing and/or a casing. These display installations and/or control surfaces are approximately smooth in shape, for the most part, and take up a certain predefined portion of the housing and/or the casing. The inclusion of the display installations and control surfaces within a housing frame and/or casing frame is known from prior art.

Combinations of display installations and control surfaces are also known from prior art. These combinations guarantee legibility and/or operability according to the respective prevailing conditions, with a goal to increase user-friendliness.

In this context, DE 198 35 433 A1 discloses a communication terminal, especially a terminal for Internet telephone with a configurable control surface, whereby the display installation (display) of the device is rigidly installed. The display installation also contains control surfaces which are modified, according to the desired functions, in order to suitably improve operability. In DE 198 35 433 A1, the display installation of the device is rigidly installed and the size and shape thereof cannot be changed.

DE 197 44 382 A1 discloses a multi-function display for automobiles which enables the display of significant values and motor parameters in an optimal position which depends on the position of the driver's seat and the placement of the steering wheel. Toward this end, information obtained from sensors with regard to the position of the driver's seat, the slope of the seat back and the position of the steering wheel is evaluated by a display control device in order to display desired information in an area which is visible to the driver.

In addition, DE 197 14 301 A1 discloses a plastic representation device—for example, made of liquid crystal—which consists of several individual representation devices which, e.g., by means of joints, can combine into a large foldable surface.

European Patent Application 0859498 A2 discloses a radio device for wireless telecommunication which is intended to enable simplified operation. The display installation of this device exhibits an integrated key field. The display installation, disclosed in this patent application, is touch-sensitive and can be configured according to the actual mode of operation. In this case as well, the arrangement of the display device involves a rigid installation on the top of the device so that an individual layout of the display installation is not possible.

In addition, EP 0651544 A2 discloses a mobile communication device (communicator) with a touch-sensitive display whereby, within the framework of this patent application, the individual elements of the display installation are installed in line with the desired arrangement in an ergonomic manner.

A common characteristic of the state of the art involves the fact that the shape and arrangement of the display installation are predetermined and cannot be modified by the user.

It is, however, generally known that users' experience the need to modify and/or adjust their electrical and/or electronic devices—including display installations integrated into casings—on an individual basis. Toward this end, attention has been called to interchangeable housing components—for example, for mobile telephones.

SUMMARY OF THE INVENTION

In view of that stated above, the objective of the present invention is to design a housing for electronic and electrical devices, and especially for mobile communication devices, and/or casings with integrated display and/or control installations, in such a way that not only the elements of the integrated display and/or control installation can be modified, but rather the entire housing and/or the entire surface can be individually configured and/or adapted.

In addition to ergonomics and operability, legibility during use of the electronic devices and/or casings equipped with the surface according to the invention should also be improved while, at the same time, increasing the degree of customization of these products.

In addition, it is proposed to configure the housing of the electrical and electronic devices in such a way that the entire surface may be used as a display installation and/or control surface whereby any desired area of the surface, as required, may be activated for the purpose of display and/or control.

Toward this end, the control surface may be integrated into the display installation, or separately activated.

BRIEF DESCRIPTION OF THE DRAWINGS

The invention will be explained in more detail in the following with reference to the accompanying drawings.

DETAILED DESCRIPTION OF THE INVENTION

Figure 1:
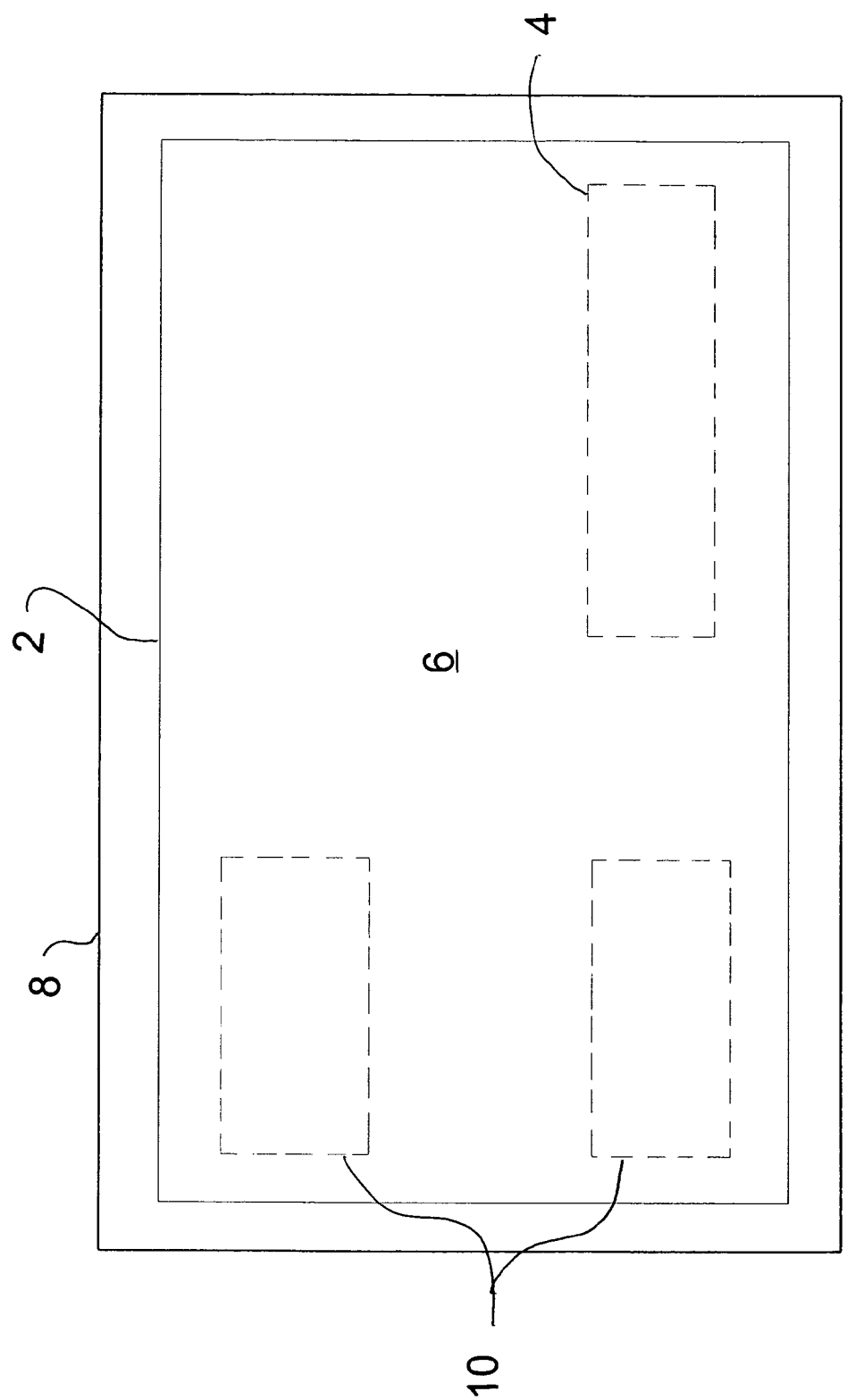
FIG. 1 is a diagrammatic view showing the housing or case according to the present invention.
Figure 2:
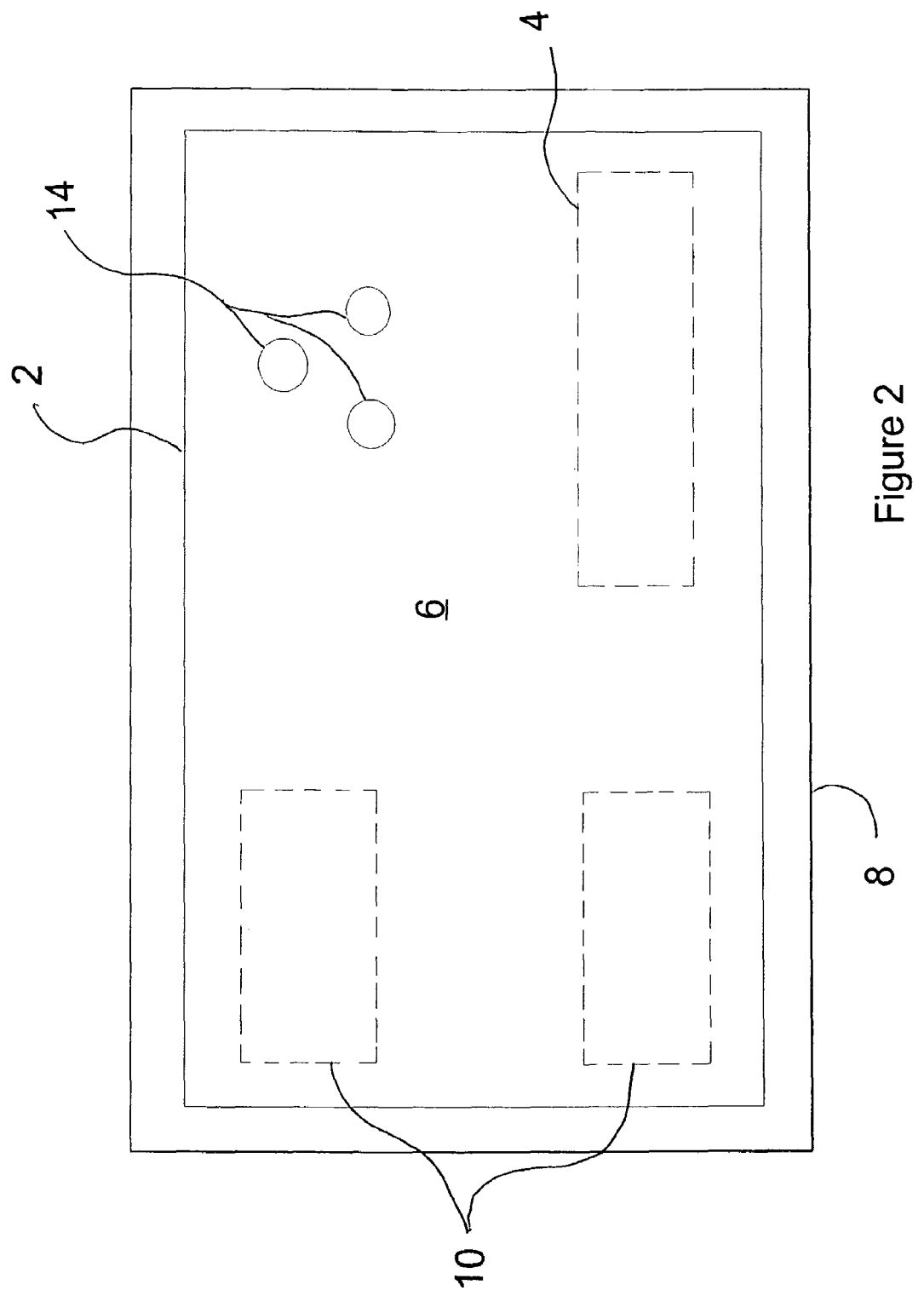
FIG. 2 is a diagrammatic view showing the dashboard according to the present invention.

Within the framework of the present invention, it will be possible for a surface 2 which is capable of activation to be individually programmed and used, in whole or in part, as an interactive control element. Toward this end, the surface which is capable of activation may be programmed by the manufacturer, or may be individually controlled, modified and programmed by the user via means of a software program 4.

A surface 2 which is capable of activation, according to the invention, may consist of LCD elements, of a suitable flat, flexible foil, or—within the framework of an additional variant—of a plasma foil 6.

A housing or a casing 8, according to the present invention, exhibits several advantages. First of all, it is possible for the user to individually define and determine the arrangement of the display installation 10 and/or the control surface so that the respective product is ergonomically adapted to the respective user. In this way, for example, it is possible to configure a mobile communication device (mobile telephone) in such a way that the keyboard is arranged on the back of the device and the display installation is divided into two parts—specifically, one part on the front and the other part on the back, for example, in order to display on the back the calling party's telephone number. With regard to dashboards 12, for example, it is possible to individually arrange the various control instruments and/or lights 14.

The surface 2 which is capable of activation, according to the invention, can also be controlled or programmed by means of data, telephone, Internet or radio interfaces.

The possibilities for application of the surface which is capable of activation, according to the invention, are extremely numerous. By way of example, we shall mention mobile telephones and additional communications devices, computers, peripheral devices such as mouse pads, keyboards, mouse devices and computer housings, but also dashboards for vehicles (cars, buses, ships, aircraft, submarines, spacecraft, trucks), radio and television sets, but also lighting and signposting devices for household, industrial, commercial and advertising use, and clocks.

The invention claimed is:

1. A housing for one of an electronic and electrical device and a casing for an electronic and an electrical device with at least one display installation, the housing or casing having at least one display installation and a control surface;

the control surface is capable of activation and is individually programmable so as to be at least partially used as an interactive control element, the control surface is capable of activation and is programmed by at least one of the manufacturer and an end user via means of a software program, the control surface comprises one of LCD elements, flat flexible foil and a plasma foil;

wherein the end user is able to individually define and determine the arrangement of at least the display installation and the control surface so that the respective product is ergonomically adapted to a need of a respective user.

2. The housing and casing according to claim 1, wherein the control surface is integrated into the display installation.

3. The housing and casing according to claim 1, wherein the control surface is capable of being one of programmed and controlled by a data interface, a telephone interface, an Internet interface and a radio interface.

4. The housing and casing according to claim 1, wherein the housing is a housing for one of a PC keyboard, a mouse, a mouse pad, a wristwatch, a radio set, a television set, a stereo set or a kitchen device.

* * * * *